(12) United States Patent
Wirth (10) Patent No.: US 8,511,076 B2
(45) Date of Patent: Aug. 20, 2013

(54) MIXING AND/OR EVAPORATING DEVICE

(75) Inventor: Georg Wirth, Kirchheim/Teck (DE)

(73) Assignee: Eberspächer Exhaust Technology GmbH & Co. KG, Neunkirchen (DE)

(*) Notice: Subject to any disclaimer, the term of this patent is extended or adjusted under 35 U.S.C. 154(b) by 293 days.

(21) Appl. No.: 12/824,496

(22) Filed: Jun. 28, 2010

(65) Prior Publication Data
US 2011/0016856 A1 Jan. 27, 2011

(30) Foreign Application Priority Data
Jul. 25, 2009 (DE) .......................... 10 2009 034 670

(51) Int. Cl.
*F01N 3/10* (2006.01)
(52) U.S. Cl.
USPC ................ 60/317; 60/324; 366/336; 366/337
(58) Field of Classification Search
USPC .............................. 60/317, 324; 366/336, 337
See application file for complete search history.

(56) References Cited

U.S. PATENT DOCUMENTS

| | | | | |
|---|---|---|---|---|
| 6,837,213 B1 * | 1/2005 | Burnett | ........................... | 123/306 |
| 2005/0223703 A1 * | 10/2005 | Wagner et al. | ................... | 60/324 |
| 2008/0267780 A1 * | 10/2008 | Wirth | ......................... | 416/204 A |
| 2008/0308083 A1 * | 12/2008 | Wirth et al. | .................... | 123/592 |

FOREIGN PATENT DOCUMENTS
DE 102007028449 10/2008
* cited by examiner

*Primary Examiner* — Kenneth Bomberg
*Assistant Examiner* — Dapinder Singh
(74) *Attorney, Agent, or Firm* — McGlew and Tuttle, P.C.

(57) ABSTRACT

A mixing and/or evaporating device (7) is provided through which exhaust gas can flow axially. The mixing and/or evaporating device (7) is arranged in an exhaust gas-carrying line of an exhaust system of an internal combustion engine, especially of a motor vehicle, with a plurality of blades (8), which are arranged distributed in the circumferential direction and which project inwardly from an outer wall (9). Each blade (8) has a profile (10) at least in an area adjoining the outer wall (9) in the axial direction (14), in which profile a discharge edge (12) has an offset (16) in the circumferential direction (15) in relation to the leading edge (11). A reduction of the flow resistance of the device (7) can be achieved if the profile (10) has an angle of incidence (17) each in relation to the axial direction (14) at the leading edge (11) and at the discharge edge (12), which angle is in a range of −10°, inclusive to +10°, inclusive.

22 Claims, 5 Drawing Sheets

MIXING AND/OR EVAPORATING DEVICE

CROSS REFERENCE TO RELATED APPLICATIONS

This application claims the benefit of priority under 35 U.S.C. §119 of German Patent Application DE 10 2009 034 670.8 filed Jul. 25, 2009, the entire contents of which are incorporated herein by reference.

FIELD OF THE INVENTION

The present invention pertains to a mixing and/or evaporating device for an exhaust system, especially of a motor vehicle. The present invention pertains, moreover, to an exhaust system equipped with such a mixing and/or evaporating device.

BACKGROUND OF THE INVENTION

For various reasons, it may be necessary in exhaust systems of internal combustion engines to introduce a liquid educt into the exhaust gas flow. For example, fuel may be injected into the exhaust gas flow upstream of an oxidation-type catalytic converter in order to trigger an exothermal combustion reaction at the oxidation-type catalytic converter arranged downstream. For example, a reducing agent, for example, ammonia, may likewise be injected into the exhaust gas flow in order to reduce nitrogen oxides carried in the exhaust gas flow in an SCR catalytic converter arranged downstream. Urea or an aqueous urea solution may also be injected into the exhaust gas flow instead of ammonia. Ammonia and water will then be formed from the urea-water solution by a hydrolysis reaction. Furthermore, a fuel or another suitable reducing agent may be injected into the exhaust gas flow upstream of an NOx storage catalyst in order to regenerate the NOx storage catalyst.

To improve or make possible the mode of action of the educt injected in the liquid form into the exhaust gas line, extensive evaporation is just as desirable as intense mixing with the exhaust gas in order to thus obtain the most homogeneous exhaust gas-educt mixture possible. The exhaust system may be equipped for this with a mixing and/or evaporating device arranged downstream in the exhaust gas line.

Such a mixing and/or evaporating device, which has a plurality of blades, which are arranged distributed in the circumferential direction and project each towards the inside from an outer wall, is known from DE 10 2007 028 449 A1. Each blade has a profile at least in an area adjoining the outer wall in the axial direction, at which a discharge edge has an offset in the circumferential direction in relation to a leading edge. The blades correspondingly have an angle of incidence in relation to the exhaust gas flow, as a result of which they can impose a twist on the exhaust gas flow. Furthermore, it is possible due to the blades having an angle of incidence to shape and arrange the blades such that they mutually overlap in the circumferential direction, as a result of which an annular surface, which is opaque in the axial direction, can be generated, which effectively hinders or even prevents the breakthrough of droplets through the mixing and/or evaporating device.

However, the swirling or twist generation, which can be brought about by means of such a prior-art mixing and/or evaporating device in the exhaust gas flow, is accompanied by an increase in pressure, which has a negative effect on the performance and efficiency of an internal combustion engine equipped with the exhaust system.

SUMMARY OF THE INVENTION

The present invention pertains to the object of providing an improved embodiment for a mixing and/or evaporating device of the type mentioned in the introduction, which is characterized especially by a reduced flow resistance.

The present invention is based on the general idea of profiling the blades and selecting their angle of incidence in relation to the exhaust gas flow such that an angle of incidence whose value is 10°, maximum, becomes established for both the leading edge and for the discharge edge in relation to the axial direction or to the exhaust gas flow. In other words, the angle of incidence in relation to the exhaust gas flow is very small on the incoming flow side and on the flow discharge side. As a consequence, there is only a very small flow deflection or flow deviation on the incoming flow side and the discharge flow side of the blades. This leads to a low flow resistance during the flow through the mixing and/or evaporating device. It is especially advantageous here that the tendency to impose a twist on the exhaust gas flow flowing through the mixing and/or evaporating device is significantly reduced. This has a lasting effect on the overall flow resistance of the exhaust gas flow downstream of the mixing and/or evaporating device, because the twist trail imposed on the exhaust gas flow is reduced in terms of rotation energy and length.

Corresponding to an advantageous embodiment, the profile of the blades between the leading edge and the discharge edge may have an angle of incidence in relation to the axial direction or the exhaust gas flow that is greater than the angle of incidence prevailing at the leading edge and at the discharge edge. Due to this measure, the offset provided between the leading edge and the discharge edge in the circumferential direction may be made comparatively great, which is advantageous for embodying the desired overlap of adjacent blades in the circumferential direction. It was found that the small angles of incidence at the leading edge and at the discharge edge are favorable for a comparatively low flow resistance of the mixing and/or evaporating device in such a configuration as well.

According to another advantageous embodiment, the angle of incidence of the profile at the leading edge and at the discharge edge may be constant along the respective blade from the outside to the inside, whereas an angle of incidence prevailing between the leading edge and the discharge edge decreases along the corresponding blade from the outside to the inside. In other words, the particular blade is twisted in the radial direction, such that the offset present in the circumferential direction between the leading edge and the discharge edge decreases from the radially outer area towards the radially inner area. This twisting is embodied such that the leading edge and the discharge edge continue to have constant angles of incidence and extend, in particular, in a straight line.

Corresponding to another advantageous embodiment, the blades have relatively large dimensions in the axial direction, as a result of which a sufficient opaqueness can be achieved in the axial direction between the leading edge and the discharge edge even in case of a comparatively small angle of incidence. In particular, the axial length of a blade, multiplied by the number of blades, is greater than the circumferential length of the outer wall, from which the blades project towards the inside.

Corresponding to an advantageous variant, the mixing and/or evaporating device may be manufactured from a single sheet metal part by forming. As a result, this mixing and/or evaporating device can be manufactured at an especially low cost. To make it possible to make the sum of the axial lengths of all blades greater than the circumference of the outer wall in such an embodiment as well, it is possible corresponding to an advantageous variant to provide the outer wall with a plurality of loopings arranged distributed over the circumference. Due to these loopings, the adjacent blades move closer together, so that a larger number of blades can be accommodated in the mixing and/or evaporating device, as a result of which the sum of the axial blade lengths can, on the whole, be increased.

It is obvious that the above-mentioned features, which will also be described below, can be used not only in the particular combination indicated, but in other combinations or alone as well, without going beyond the scope of the present invention.

Preferred embodiments of the present invention are shown in the drawings and will be explained in more detail below, wherein identical reference numbers designate identical or similar or functionally identical components. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Referring to the drawings in particular, the absolute numerical data given above and below for dimensions and angles are always defined within the framework of the usual manufacturing tolerances.

Figure 1:
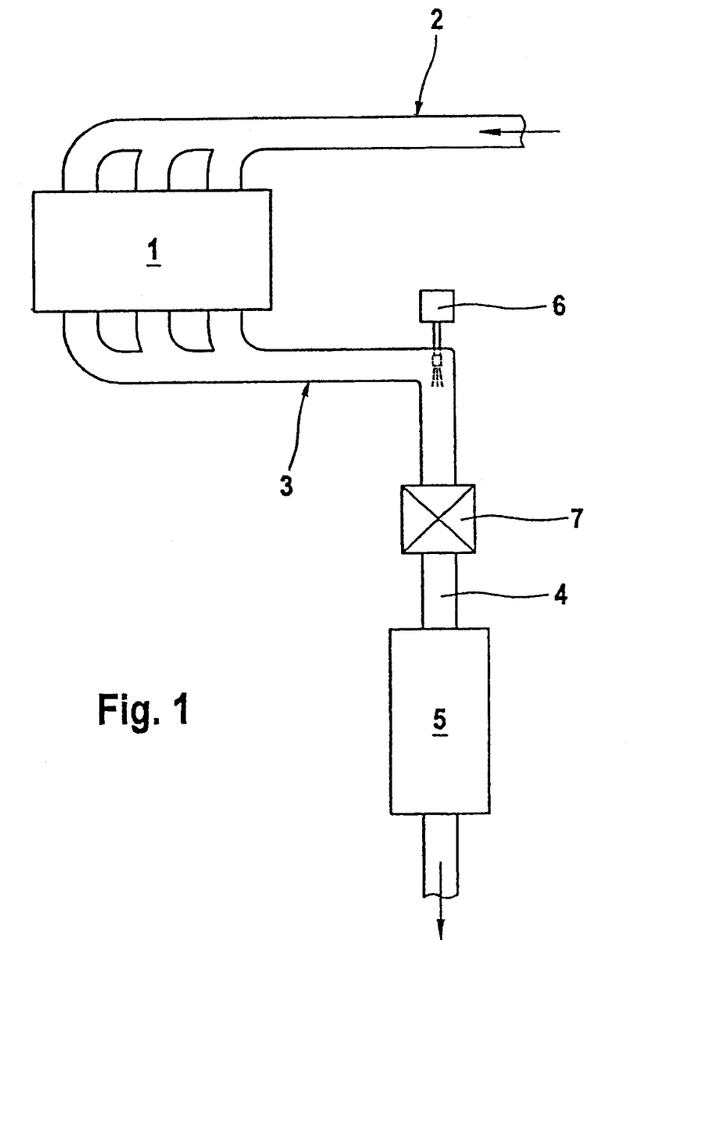
FIG. 1 is a greatly simplified general view of an exhaust system according to the invention.

Corresponding to FIG. 1, an internal combustion engine 1, which may be arranged, for example, in a motor vehicle, has a fresh gas system 2 for supplying with fresh gas, preferably air, and an exhaust system 3 for removing exhaust gas. Such an exhaust system 3 comprises an exhaust gas-carrying line 4, which removes the exhaust gas generated at the internal combustion engine from the internal combustion engine 1 during the operation of said internal combustion engine. The exhaust system 3 may have at least one exhaust gas-treating device 5, which is integrated in the exhaust gas-carrying line 4. This exhaust gas-treating device 5 may be, for example, an oxidation-type catalytic converter, an NOx storage catalyst, a hydrolysis reactor, an SCR catalytic converter or a particle filter. Individual said device or a plurality of said device may likewise be accommodated in a common housing, especially in conjunction with an exhaust muffler. Furthermore, the exhaust system 3 has an injection device 6, which is designed to inject a liquid educt into the exhaust gas-carrying line 4. The injection device 6 is arranged at the exhaust gas-carrying line 4 upstream of the exhaust gas-treating device 5. The liquid educt may be preferably fuel, especially the same fuel with which the internal combustion engine 1 is also operated. As an alternative, the educt may also be ammonia or urea or an aqueous urea solution. If fuel injection is provided, the exhaust gas-treating device 5 directly adjacent to the injection device 6 is preferably an oxidation-type catalytic converter, at which conversion of the fuel into heat takes place, for example, in order to bring the oxidation-type catalytic converter to its operating temperature or to heat a particle filter arranged downstream of the oxidation-type catalytic converter to a regeneration temperature. If the injection device 6 is designed to inject ammonia, the exhaust gas-treating device 5 may be an SCR catalytic converter. If urea or a urea-water solution is injected, the exhaust gas-treating device 5 arranged directly downstream may preferably be a hydrolysis reactor or hydrolysis catalytic converter, in which the urea is converted into ammonia in order to be admitted to a downstream SCR catalytic converter. The injection device 6 may also be followed directly by an exhaust gas-treating device 5 designed as an SCR catalytic converter, in which the hydrolysis reaction additionally takes place. Moreover, any other applications are also conceivable for the injection of a liquid educt into the exhaust gas-carrying line 4 with and without interaction with the exhaust gas-treating device 5.

Corresponding to FIG. 1, axial orientation of the educt jet is preferred for the injection of the educt, which is embodied here as an example by a corresponding bending or angulation in the exhaust gas-carrying line 4.

To make it possible to evaporate the injected liquid educt in the exhaust gas as rapidly and as completely as possible and to mix the evaporated educt with the exhaust gas as homogeneously as possible, exhaust system 3 is equipped with a mixing and/or evaporating device 7, which is arranged in the exhaust gas-carrying line 4, namely, downstream of the injection device 6 and preferably upstream or directly at or in the exhaust gas-treating device 5 adjacent to the injection device 6.

Preferred embodiments of the mixing and/or evaporating device 7, which will also hereinafter be called device 7 for short, will be explained in more detail below with reference to FIGS. 2-12.

Corresponding to FIGS. 2-12, the corresponding device 7 has a plurality of blades 8, which are arranged distributed in the circumferential direction and project inwardly from an outer wall 9 of said device 7. Corresponding to FIG. 3, each blade 8 has, in the axial section or in the axial direction, a profile 10 with a leading edge 11 and with a discharge edge 12. A direction of flow prevailing during the operation of said device 7 is indicated by an arrow 13, for example, in FIG. 3. The axial direction of said device 7 is indicated by a dash-dotted line, for example, in FIG. 3 and is designated by 14.

Figure 2:
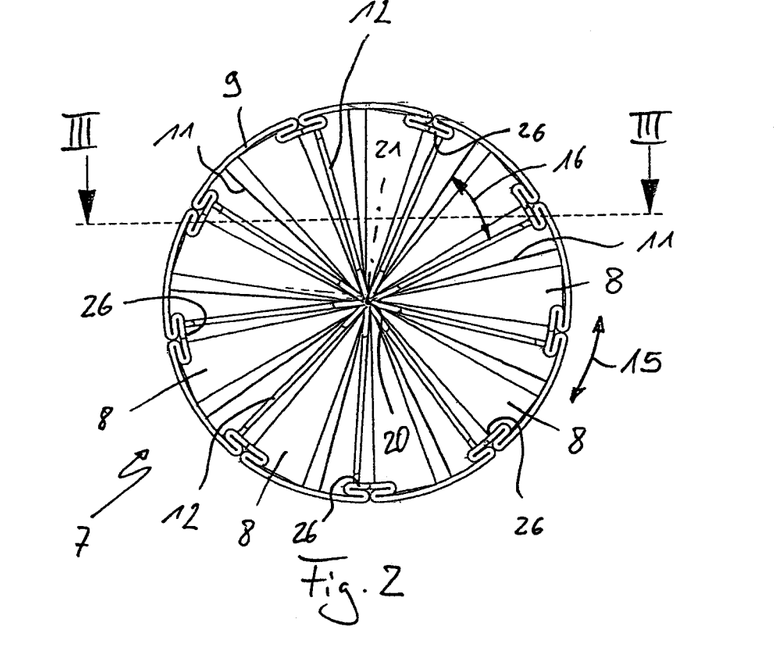
FIG. 2 is an axial view of a mixing and/or evaporating device on the flow discharge side thereof.
Figure 3:
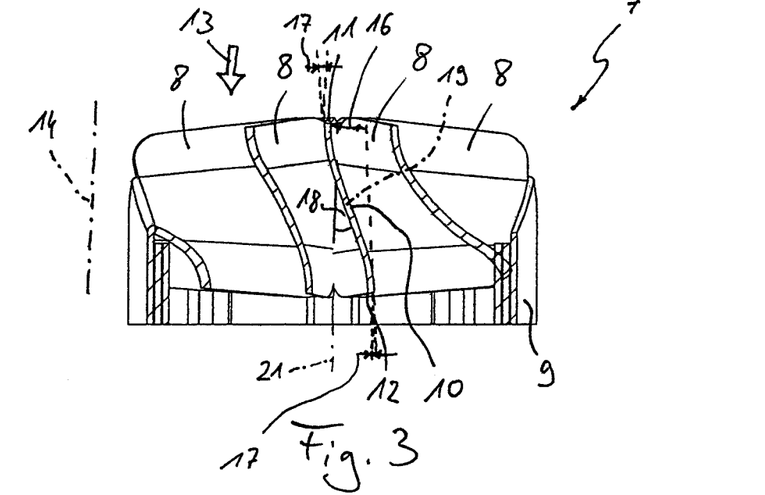
FIG. 3 is a sectional view of the mixing and/or evaporating device corresponding to section line III in FIG. 2.
Figures 4, 5, 6:
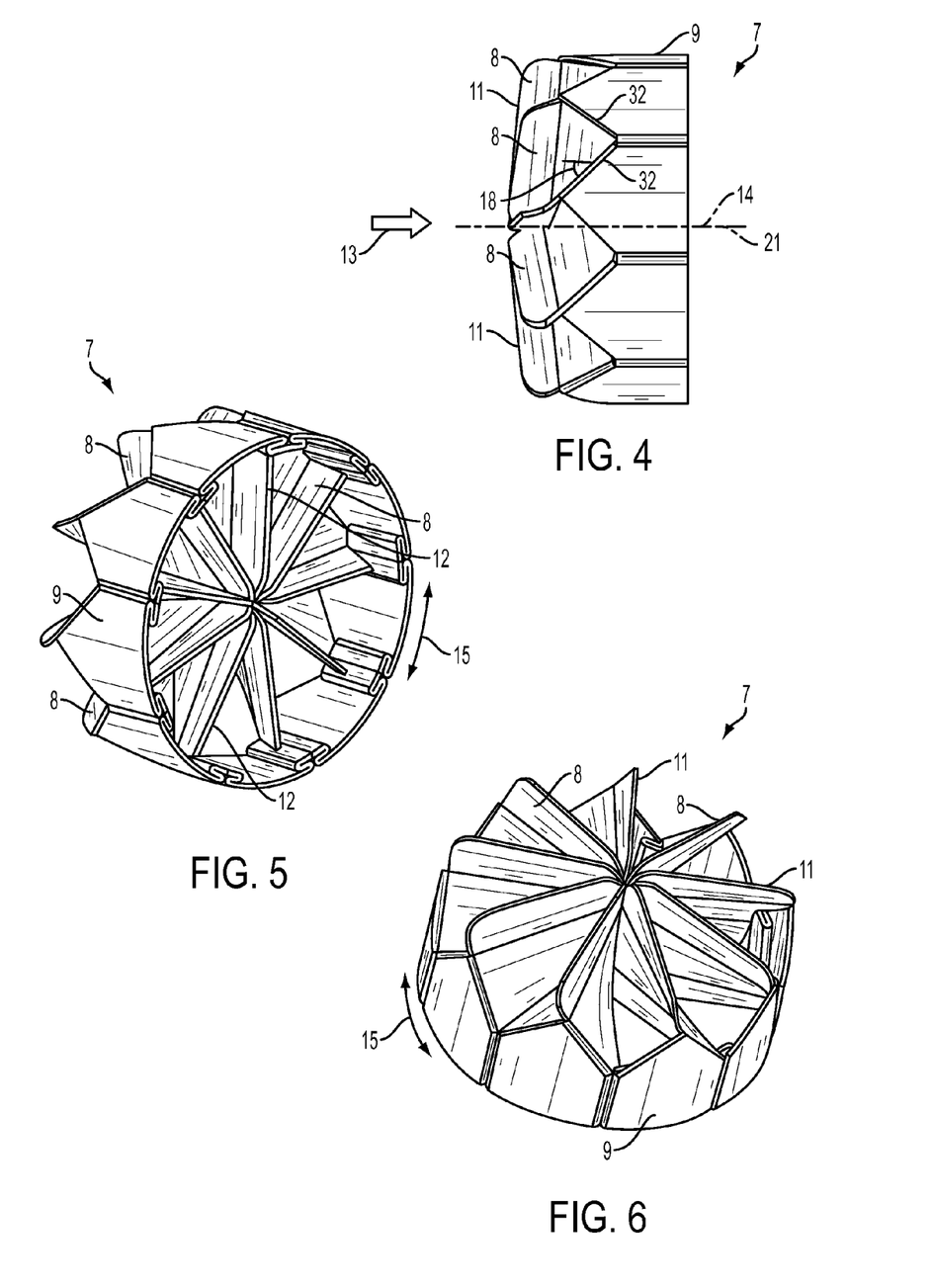
FIG. 4 is a side view of the mixing and/or evaporating device.
FIG. 5 is a perspective view of the mixing and/or evaporating device on the discharge flow side thereof.
FIG. 6 is a perspective view as in FIG. 5, but towards the incoming flow side of the mixing and/or evaporating device.

The circumferential direction of said device 7 is indicated by a bent double arrow 15, for example, in FIG. 2.

Blades 8 are profiled at least in an area adjoining the outer wall 9 such that there is an offset 16 between the leading edge 11 and the discharge edge 12. As a result, the corresponding blade 8 has an angle of incidence at least in this area adjoining the outer wall 9 in relation to the exhaust gas flow 13.

It is remarkable that profile 10 has an angle of incidence 17 that is small and is in a range of −10°, incl., to +10°, incl., at both the leading edge 11 and the discharge edge 12. The angle of incidence 17, which the leading edge 11 and the discharge edge 12 assume in relation to the axial direction 14, is preferably in a range of −5°, incl. to +5°, incl. The angles of incidence 17 of the leading edge 11 and of the discharge edge 12 do not have to be equal. In particular, they may also have different signs. Preferred is, however, an embodiment in which said angle of incidence 17 essentially has a value of zero, so that profile 10 is oriented essentially in parallel to the axial direction 14 at its leading edge 11 and at its discharge edge 12.

To embody a comparatively great offset 16 in the circumferential direction 15, said profile 10 has an angle of incidence 18 between the leading edge 11 and the discharge edge 12 in relation to the axial direction 14 that is greater than the angle of incidence 17 prevailing at the leading edge 11 and at the discharge edge 12. For example, the angle of incidence 18 between the leading edge 11 and the discharge edge 12 may increase to a value of at least 30°. The angle of incidence 18 of profile 10 that prevails between the leading edge 11 and the discharge edge 12 directly at the outer wall 9 in the examples shown reaches values as high as 45° or about 45°. The angle of incidence 18 prevailing between the leading edge 11 and the discharge edge 12 increases from the value prevailing at the leading edge 11 to its maximum and then drops to the value prevailing at the discharge edge 12.

Profile 10 is preferably shaped such that it not stepped from the leading edge 11 to the discharge edge 12 and has especially a continuous course. Especially advantageous is here an embodiment in which the particular profile 10 has a single turning point only between its leading edge 11 and its discharge edge 12, which is designated by 19 in FIG. 3. Turning point 19 lies on an imaginary center line of profile 10, which is located centrally between the incoming flow side and the discharge flow side of profile 10. Furthermore, turning point 19 is preferably arranged centrally between the leading edge 11 and the discharge edge 12, so that the change in the angle of incidence 19 along profile 10 can increase and decrease especially symmetrically. The geometry of the blades 8 or the shape of profile 10 may also have a straight section 32, which is located between the leading edge 11 and the discharge edge 12, especially centrally, doing so according to FIG. 4 at least directly at the outer wall 9.

In addition, blades 8 are profiled and shaped in the preferred embodiments being shown here such that the offset 16 present in the circumferential direction between the leading edge 11 and the discharge edge 12 decreases along the respective blade 8 from the outside to the inside. This is achieved by the twisting of the corresponding blade 8 in relation to its radial extension. The twisting of the blades 8 is embodied in the special embodiments being shown here such that the angle of incidence 17 of profile 10 is constant at the leading edge 11 and at the discharge edge 12 along the corresponding blade 8 from the outside to the inside. The angle of incidence 17 occurring at the leading edge 11 and at the discharge edge 12 is thus equal over the entire radial extension of the blades 8. However, contrary to this, the angle of incidence 18 prevailing between the leading edge 11 and the discharge edge 12 varies along the radial extension of the blades 8. Said angle of incidence 18 prevailing between the leading edge 11 and the discharge edge 12 decreases along the corresponding blade 8 from the outside to the inside. Thus, the greatest angle of incidence 18 of profile 10 prevails in the area of the outer wall 9 between the leading edge 11 and the discharge edge 12, as a result of which the greatest offset 16 prevails as well. Contrary to this, the smallest angle of incidence occurs at a radially inward end of the respective blade 8 between the leading edge 11 and the discharge edge 12, which leads to the smallest offset 16.

Especially advantageous is here an embodiment as can be recognized, for example, in FIG. 2, in which the corresponding blade 8 has a straight end edge 20 at its end that is the distal end towards the outer wall 9, I. e., at its inner end. The respective end edge 20 extends here in parallel to the axial direction 14. In other words, the angle of incidence 17 or 18 is set at this inner end edge 20 continuously to zero value from the leading edge 11 to the discharge edge 12, so that there is no angle of incidence at the end edge 20 and there also is no offset 16 between the leading edge 11 and the discharge edge 12. The inner end edges 20 of blades 8 can also be positioned very close to one another due to this shape. In particular, it is possible to position the inner ends as free-standing ends, so that blades 8 do not touch each other at their inner ends.

An embodiment in which blades 8 touch each other at their inner ends and are especially supported at each other is possible as well. Blades 8 may be preferably supported at their inner ends under a prestress, as a result of which a specific stiffening of said device 7 can be achieved in the mounted state.

In addition, blades 8 are advantageously shaped such that the leading edges 11 extend straight, I. e., along straight lines, along the respective blade 8 from the outside to the inside. In addition or as an alternative, the discharge edges 12 may also extend straight, I. e., along straight lines, along the corresponding blade 8 from the outside to the inside. These straight leading edges 11 and the straight discharge edges 12 are oriented exactly radially in the example, so that they extend radially in a star-shaped pattern from a central longitudinal axis 21 of said device 7.

Figures 7, 8, 9, 10:
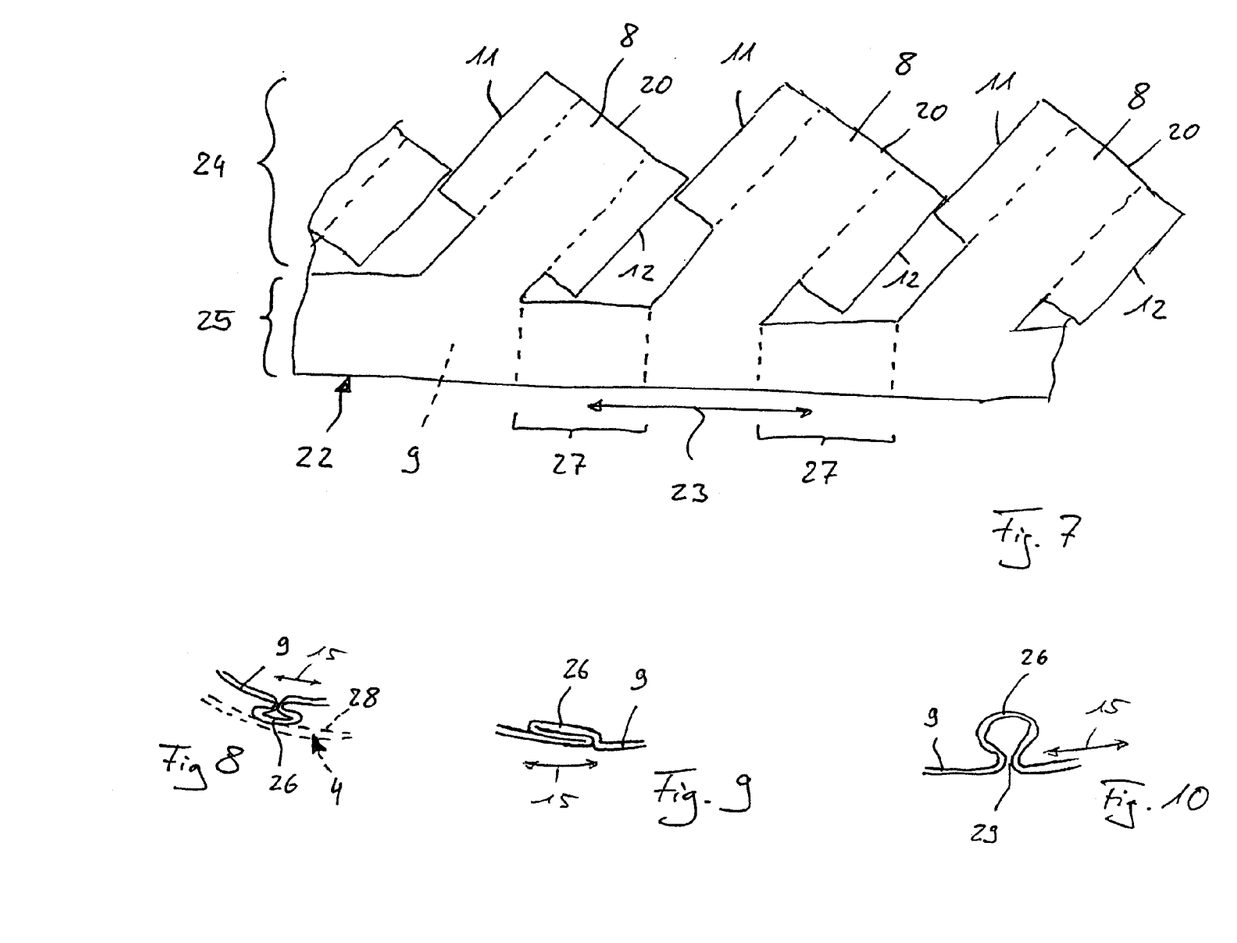
FIG. 7 is a top view of a sheet metal body for manufacturing the mixing and/or evaporating device.
FIG. 8 is an axial detail view in the area of loopings of an outer wall of the mixing and/or evaporating device.
FIG. 9 is an axial detail view in the area of loopings of an outer wall of the mixing and/or evaporating device.
FIG. 10 is an axial detail view in the area of loopings of an outer wall of the mixing and/or evaporating device.
Figure 11:
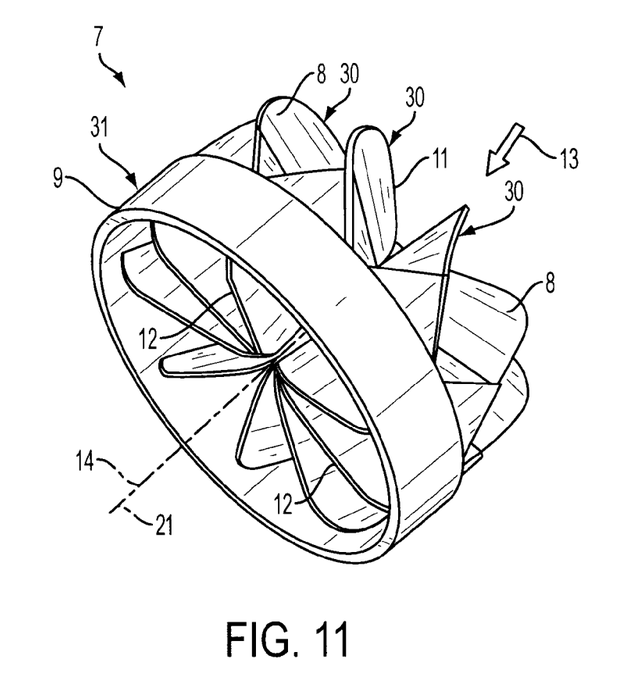
FIG. 11 is a view as in FIG. 5, but for another embodiment of the mixing and/or evaporating device.
Figure 12:
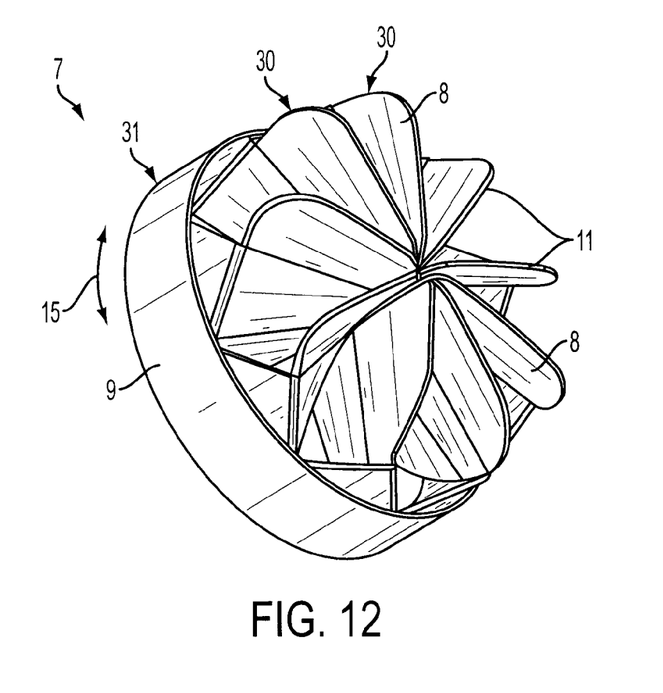
FIG. 12 is a view as in FIG. 6, but for embodiment of the mixing and/or evaporating device shown in FIG. 11.

FIGS. 2-6 show an embodiment of said device 7 in which said device 7 is made of a single sheet metal part 22 by forming, which said part is shown in FIG. 7. Corresponding to FIG. 7, the sheet metal part 22 extends in the state of manufacture being shown here, in which said sheet metal part 22 is bent or rolled off, in the drawing plane as well as in a longitudinal direction 23. In respect to this longitudinal direction 23, sheet metal part 22 is strip-shaped, so that it can hereinafter also be called a sheet metal strip 22. In the state of manufacture shown in FIG. 7, the blades 8 are already cut free or punched out on an (upper) longitudinal side 24 of the sheet metal strip 22. The leading edges 11, discharge edges 12 and straight inner end edges 20 can be recognized. The rounded transitions from the edges, e.g., 11 and 12, which are radial in the mounted state, to the edges, e.g., 20, which are axial in the mounted state, which can be recognized in FIGS. 2-6, are not shown in FIG. 7 for a simplified representation.

The other (lower) longitudinal side 25 connects the individual blades 8 with one another and forms the outer wall 9 in the finished state of said device 7. The sheet metal strip 22 is wound up or rolled up for this in its plane at right angles to its longitudinal direction 23, such that the longitudinal direction 23 of the sheet metal strip 22 will subsequently extend in the circumferential direction 15 of outer wall 9.

To now make it possible to arrange the largest possible number of blades 8 along the outer wall 9, it may be useful to carry out the forming of the sheet metal strip 22 or the longitudinal side 25 thereof into the outer wall 9 such that the longitudinal side 25 assigned to the outer wall 9 is longer in the non-formed state shown in FIG. 7 than the circumference of the outer wall 9 made therefrom. The forming of the sheet metal strip 22 may be performed for this such that the outer wall 9 is provided with a plurality of loopings recognizable in FIGS. 2-6, which are arranged distributed in the circumferential direction 15. These loopings 26 are formed from the areas 27 of the longitudinal side 25, which are marked by braces in FIG. 7, and which are assigned to the outer wall 9. These areas or sections 27 extend in the longitudinal direction 23 of this longitudinal side assigned to the outer wall 9 between consecutive blades 8. An embodiment can hereby be obtained for said device 7 in an especially simple manner, which comprises a single shaped sheet metal part (sheet metal strip 22) and in which the axial length of a blade 8, multiplied by the number of blades 8, is greater than the circumferential length of the outer wall 9.

The loopings 26 project inwardly from the outer wall 9 in the embodiment shown in FIGS. 2-6. They are designed such that they are flatly or two-dimensionally in contact. The loopings 26 are shaped symmetrically in relation to the circumferential direction 15 in the embodiments shown in FIGS. 2-6.

FIG. 8 shows a looping 26 of another embodiment, in which the loopings 26 project outwardly from the outer wall 9. In the installed state of said device 7, the loopings 26 may support the outer wall 9 at an inner wall 28 of the exhaust gas-carrying line 4 of the exhaust system 3, which said inner wall is indicated by interrupted lines in FIG. 8. They may be shaped such that they embody an elastic support in the radial direction, on the one hand, and/or make possible a prestressed positioning and hence fixation of said device 7 even axially in said line 4, on the other hand.

Especially advantageous is an embodiment in which the loopings 26 are arranged as much as possible in the flow shadow of the respective blades 8. FIG. 9 shows an embodiment in which the loopings 26 are shaped asymmetrically in relation to the circumferential direction and thus make it possible, in particular, to fully accommodate one of the blades 8 in the flow shadow. The loopings 26 are designed such that they are flatly in contact and, in addition, project inwardly in the embodiment shown in FIG. 9 as well.

FIG. 10 shows another variant for embodying the loopings 26. The looping 26 shown projects inwardly from the outer wall 9 here as well. It is remarkable in this variant that the loopings 26 are shaped such that the outer wall 9 has a gap 29 in the area of the corresponding looping 26, as a result of which a spring action can be achieved by means of the corresponding looping 26 in the circumferential direction 15 as well, for example, in order to make it possible to compensate manufacturing tolerances and/or thermal expansion effects in the circumferential direction 15.

As an alternative to the one-part embodiment explained with reference to FIGS. 2-10, FIGS. 11 and 12 show another embodiment, in which said device 7 is not formed integrally from a single sheet metal part 22, but in which said device 7 is built. Said device 7 has for this purpose a plurality of blade parts 30, which have at least one blade 8 each. Furthermore, a ring body 31 is provided, which forms the outer wall 9. The blade parts 30 are attached to the ring body 31 in order to thus build up said device 7. Ring body 31 may be interrupted or slotted at least at one point in the circumferential direction 15 in order to compensate, e.g., manufacturing tolerances and/or thermal expansion effects in the circumferential direction 15. The corresponding blade part 30 may also comprise or form two or more blades 8 in a special embodiment. The built variant of said device 7 shown in FIGS. 11 and 12 makes do without loopings 26 projecting from the outer wall 9 to the inside or to the outside.

While specific embodiments of the invention have been described in detail to illustrate the application of the principles of the invention, it will be understood that the invention may be embodied otherwise without departing from such principles.

What is claimed is:

1. A mixing and/or evaporating device, through which exhaust gas can flow axially, for being arranged in an exhaust gas-carrying line of an exhaust system of a motor vehicle internal combustion engine, the device comprising:
an outer wall; and
a plurality of blades arranged distributed in a circumferential direction, each of the blades projecting inwardly from the outer wall, wherein:
each blade has a profile, at least in an area adjoining the outer wall in an axial direction of said outer wall, with a discharge edge offset in the circumferential direction in relation to a leading edge;
at each of the leading edge and at the discharge edge, the profile has an angle of incidence in relation to the axial direction which is in a range of from −10° inclusive to +10° inclusive; and between the leading edge and the discharge edge, the profile has an angle of incidence in relation to the axial direction, which is greater than the angle of incidence prevailing at the leading edge and at the discharge edge.

2. A mixing and/or evaporating device in accordance with claim 1, wherein the angle of incidence of the profile equals at most 5° at the leading edge and at most 5° at the discharge edge.

3. A mixing and/or evaporating device in accordance with claim 1, wherein the profile is oriented essentially in parallel to the axial direction at the leading edge and essentially in parallel to the axial direction at the discharge edge.

4. A mixing and/or evaporating device in accordance with claim 1, wherein the profile has a turning point between the leading edge and the discharge edge.

5. A mixing and/or evaporating device in accordance with claim 4, wherein the turning point is arranged approximately in a middle region between the leading edge and the discharge edge, said middle region comprising a central axis, said leading edge being arranged on one side of said central axis, said discharge edge being arranged on another side of said central axis, said central axis being parallel to said axial direction.

6. A mixing and/or evaporating device in accordance with claim 1, wherein the profile is not stepped from the leading edge to the discharge edge.

7. A mixing and/or evaporating device in accordance with claim 1, wherein the offset between said leading edge and said discharge edge decreases along the corresponding blade from the outside to the inside of said corresponding blade.

8. A mixing and/or evaporating device in accordance with claim 1, wherein the angle of incidence of the profile at the leading edge and at the discharge edge is constant along each blade from the outside to the inside of each blade, while an angle of incidence of the profile prevailing between the leading edge and the discharge edge decreases along the respective blade from the outside to the inside of the respective blade.

9. A mixing and/or evaporating device in accordance with claim 1, wherein at least one leading edge extends straight along the respective blade from the outside to the inside of the respective blade and the discharge edge extends straight along the respective blade from the outside to the inside of the respective blade.

10. A mixing and/or evaporating device in accordance with claim 1, wherein:
each respective blade has an end, which is distal from the outer wall, the end being located on the inside and the end having a straight end edge which extends in parallel to the axial direction.

11. A mixing and/or evaporating device in accordance with claim 1, wherein the blades have each a free-standing end, which is distal from the outer wall and is located on the inside, so that the blades do not touch each other at inner ends thereof.

12. A mixing and/or evaporating device in accordance with claim 1, wherein an axial length of each blade, multiplied by the number of blades, is greater than a circumferential length of the outer wall.

13. A mixing and/or evaporating device in accordance with claim 1, further comprising
a plurality of blade parts, each blade part having at least one of the blades; and
a ring body forming the outer wall.

14. A mixing and/or evaporating device in accordance with claim 1, wherein the mixing and/or evaporating device is manufactured from a single sheet metal part by forming.

15. A mixing and/or evaporating device in accordance with claim 14, wherein the sheet metal part is a sheet metal strip, at which the blades are cut free or punched out on one longitudinal side and whose other longitudinal side forms the outer wall.

16. A mixing and/or evaporating device in accordance with claim 15, wherein the longitudinal side of the sheet metal strip, which side is assigned to the outer wall, is longer in the non-formed state than the circumference of the outer wall.

17. A mixing and/or evaporating device in accordance with claim 1, wherein the outer wall has a plurality of loopings arranged distributed in the circumferential direction.

18. A mixing and/or evaporating device in accordance with claim 17, wherein the loopings project to the outside from the outer wall, and the loopings support the outer wall at an inner wall of the exhaust gas-carrying line of the exhaust system in the installed state of the mixing and/or evaporating device.

19. A mixing and/or evaporating device in accordance with claim 17, wherein the loopings project inwardly from the outer wall.

20. A mixing and/or evaporating device in accordance with claim 17, wherein the loopings are arranged each in a flow shadow of one of the blades.

21. A mixing and/or evaporating device in accordance with claim 17, wherein the loopings are designed such that they are flat or are flatly in contact.

22. An exhaust system for a motor vehicle internal combustion engine, the system comprising:
an exhaust gas-carrying line; and
a mixing and/or evaporating device connected in the exhaust gas-carrying line, the mixing and/or evaporating device comprising:
an outer wall; and
a plurality of blades arranged distributed in a circumferential direction, each of the blades projecting inwardly from the outer wall, wherein:
each blade has a profile, at least in an area adjoining the outer wall in an axial direction of said outer wall, with a discharge edge offset in the circumferential direction in relation to a leading edge;
at each of the leading edge and at the discharge edge, the profile has an angle of incidence in relation to the axial direction which is in a range of from −10° inclusive to +10° inclusive; and between the leading edge and the discharge edge, the profile has an angle of incidence in relation to the axial direction, which is greater than the angle of incidence prevailing at the leading edge and at the discharge edge.

* * * * *